(12) United States Patent
Toas et al.

(10) Patent No.: US 6,769,455 B2
(45) Date of Patent: Aug. 3, 2004

(54) MOISTURE REPELLENT AIR DUCT PRODUCTS

(75) Inventors: Murray S. Toas, Norristown, PA (US); John O. Ruid, Schwenksville, PA (US)

(73) Assignee: CertainTeed Corporation, Valley Forge, PA (US)

(*) Notice: Subject to any disclaimer, the term of this patent is extended or adjusted under 35 U.S.C. 154(b) by 92 days.

(21) Appl. No.: 09/788,760

(22) Filed: Feb. 20, 2001

(65) Prior Publication Data

US 2002/0139429 A1 Oct. 3, 2002

(51) Int. Cl.⁷ .................................................. F16L 9/14
(52) U.S. Cl. .......................... 138/149; 138/146; 138/153
(58) Field of Search ................................ 138/149, 146, 138/124, 125, 153

(56) References Cited

U.S. PATENT DOCUMENTS

| | | |
|---|---|---|
| 2,341,130 A | 2/1944 | Unsworth |
| 2,467,291 A | 4/1949 | Brelsford et al. |
| 2,619,151 A | 11/1952 | Sheidley |
| 2,647,857 A | 8/1953 | Horne |
| 2,825,389 A | 3/1958 | Stephens |
| 3,002,857 A * | 10/1961 | Stalego ...................... 106/628 |
| 3,025,197 A | 3/1962 | Sheidley |
| 3,092,529 A | 6/1963 | Pearson |
| 3,093,037 A | 6/1963 | Ward, Jr. |
| 3,212,529 A | 10/1965 | Ullman et al. |
| 3,394,737 A | 7/1968 | Hoffmann et al. |
| 3,420,142 A | 1/1969 | Gale et al. |
| 3,549,473 A * | 12/1970 | Le Blanc et al. ............ 428/392 |
| 3,557,840 A | 1/1971 | Maybee |
| 3,605,534 A | 9/1971 | Barr |
| 3,615,969 A | 10/1971 | Hegg |
| 3,642,554 A | 2/1972 | Hensley |
| 3,768,523 A * | 10/1973 | Schroeder ..................... 138/141 |
| 3,861,425 A | 1/1975 | Clark |
| 3,867,221 A | 2/1975 | Chant |
| 3,885,593 A | 5/1975 | Koerber et al. |
| 3,915,783 A | 10/1975 | Goppel et al. |
| 4,005,234 A * | 1/1977 | Stroupe ...................... 138/127 |
| 4,067,678 A | 1/1978 | Beranek, Jr. et al. |
| 4,101,700 A | 7/1978 | Ray et al. |
| 4,175,159 A * | 11/1979 | Raleigh ...................... 428/405 |
| 4,183,379 A | 1/1980 | Marquette et al. |
| 4,196,755 A | 4/1980 | Kutnyak et al. |
| 4,243,075 A * | 1/1981 | McPherson et al. ........ 138/174 |
| 4,304,267 A * | 12/1981 | Campbell, Jr. .............. 138/149 |
| 4,310,585 A * | 1/1982 | Shannon ..................... 138/145 |
| 4,389,587 A * | 6/1983 | Levine et al. ............... 138/140 |

(List continued on next page.)

FOREIGN PATENT DOCUMENTS

| | | |
|---|---|---|
| ES | 9402661 | 12/1994 |
| FR | 1137652 | 6/1957 |

OTHER PUBLICATIONS

Weiss, Herbert L., Coating and Laminating, Converting Technology Company, Milwaukee, Wisconsin, pp. 7–9, 196–202, 1977.

Elasti–Glass® R3100B Series Glass Fiber Mats, Schuller, 2 pages, May 1997.

Knauf Air Duct Board, Form No. AH–SS–2 Effective: 1/98, 2 pages.

(List continued on next page.)

*Primary Examiner*—James Hook
(74) *Attorney, Agent, or Firm*—Duane Morris LLP

(57) ABSTRACT

Water resistant fibrous air duct insulation products and methods for making such products. The products may include a duct board or a duct tube including a plurality of layers of resin-bonded fibrous mat. The duct board or tube is preferably rendered water-repellent at the air stream surface by incorporating a hydrophobic agent into the resin of at least one of the layers adjacent the air stream surface.

13 Claims, 1 Drawing Sheet

U.S. PATENT DOCUMENTS

| | | |
|---|---|---|
| 4,456,637 A | 6/1984 | Takeda et al. |
| 4,528,053 A | 7/1985 | Auer |
| 4,573,715 A | 3/1986 | Armbruster |
| 4,621,013 A | 11/1986 | Holtrop et al. |
| 4,680,070 A | 7/1987 | Hughes |
| 4,709,523 A | 12/1987 | Broderick et al. |
| 4,839,222 A | 6/1989 | Jain |
| 4,887,663 A | 12/1989 | Auxier et al. |
| 4,895,745 A | 1/1990 | Vesley et al. |
| 4,909,282 A | 3/1990 | Staugaard |
| 4,968,556 A | 11/1990 | Jain |
| 4,983,081 A | 1/1991 | Cunningham, Jr. |
| 4,990,370 A | 2/1991 | Terry et al. |
| 5,020,481 A | 6/1991 | Nelson |
| 5,025,052 A | 6/1991 | Crater et al. |
| 5,144,795 A | 9/1992 | Field |
| 5,169,700 A * | 12/1992 | Meier et al. .................. 428/74 |
| 5,186,704 A | 2/1993 | Cunningham, Jr. |
| 5,300,592 A | 4/1994 | Kanagawa et al. |
| 5,310,594 A | 5/1994 | Holland et al. |
| 5,314,719 A | 5/1994 | Batdorf et al. |
| 5,370,919 A | 12/1994 | Fieuws et al. |
| 5,379,806 A | 1/1995 | Matthews et al. |
| 5,385,610 A | 1/1995 | Deerer et al. |
| 5,421,938 A | 6/1995 | Cunningham, Jr. |
| 5,460,206 A | 10/1995 | Sansoucy |
| 5,487,412 A | 1/1996 | Matthews et al. |
| 5,528,904 A | 6/1996 | Jones et al. |
| 5,534,298 A | 7/1996 | Cross et al. |
| 5,567,504 A | 10/1996 | Schakel et al. |
| 5,578,258 A | 11/1996 | Grant et al. |
| 5,625,999 A | 5/1997 | Buzza et al. |
| 5,750,225 A | 5/1998 | Petty |
| 5,762,109 A | 6/1998 | Matthews et al. |
| 5,765,586 A | 6/1998 | Facas et al. |
| 5,783,268 A | 7/1998 | Noonan et al. |
| 5,783,623 A | 7/1998 | Skoufis et al. |
| 5,836,357 A * | 11/1998 | Kittson et al. ................ 138/98 |
| 5,953,818 A | 9/1999 | Matthews et al. |
| 5,958,137 A | 9/1999 | Caldwell et al. |
| 5,985,429 A | 11/1999 | Plummer et al. |
| 6,000,437 A | 12/1999 | Ponder et al. |
| 6,148,867 A | 11/2000 | Matthews et al. |
| 6,207,245 B1 | 3/2001 | Miller et al. |
| 6,213,522 B1 | 4/2001 | Jacobson et al. |
| 6,231,927 B1 | 5/2001 | Ruid |
| 6,270,865 B1 | 8/2001 | Noonan et al. |
| 6,331,350 B1 | 12/2001 | Taylor et al. |
| 6,457,237 B1 | 10/2002 | Matthews et al. |
| 2001/0033782 A1 | 10/2001 | Conley |
| 2001/0033926 A1 | 10/2001 | Matthews et al. |
| 2002/0127399 A1 | 9/2002 | Mankell et al. |
| 2002/0146521 A1 * | 10/2002 | Toas et al. .................. 428/34.1 |
| 2003/0008092 A1 * | 1/2003 | Toas et al. ............... 428/36.91 |
| 2003/0068943 A1 | 4/2003 | Fay |

OTHER PUBLICATIONS

Knauf Fiber Glass Insulation—Products 7 pages, Feb. 2002.

CertainTeed Specification Sheet, ToughGard™ Duct Board, 2 pages, Feb. 2002.

Testing Data from the Competitive Audit on Mar. 25, 1999, 3 pages.

"Wire Wound Rod," Lembo–ITTI, http://www.lembo–itti.com/fx170005.htm Oct. 20, 1998.

Underwriters Laboratories Inc., "Report on Air Ducts", Jun. 8, 1992, Northbrook, Illinois, USA.

CertainTeed Corporation, "Certa*Faced Ultra*Duct Marketing Plan", Nov. 22, 1993.

CertainTeed Corporation, "Product Specification: PS 57.00", May 23, 1994.

CertainTeed Corporation, "Raw Material Specification: Certa*Faced Ultra*Duct Mat Facing", Jun. 23, 1994.

CertainTeed Corporation, "List Prices—ToughGard Duct Board", Oct. 1, 1994, Valley Forge, Pennsylvania, USA.

Underwriters Laboratories Inc., "Investigation of 'Climaver 284' Air Duct Board", Dec. 19, 1991, Northbrook, Illinois, USA.

North American Insulation Manufacturers Association, "Fibrous Glass Duct Construction Standards", $2^{nd}$ Edition, 1993.

Owens Corning, "Submittal Sheet—EnDura Coat Duct Board", May 2001, USA.

CertainTeed Corporation, "Specification Sheet—ToughGard Duct Board with Enhanced Surface", Jan. 2002.

CertainTeed Corporation, "Specification Sheet—Ultra*Duct Gold", Mar. 2002.

Owens Corning, "Submittal Sheet—Aeromat Duct Liner", May 2001, USA.

Knauf Fiber Glass GmbH, "Submittal Sheet—Air Duct Board–M with Hydroshield Technology", Oct. 2000, USA.

Aircon, "Ventilation, Extraction and Air Conditioning—Installation Materials", Nov. 1991.

Underwriters Laboratories Inc., "Gas and Oil Equipment 1993", 1993.

Underwriters Laboratories Inc., "Gas and Oil Equipment 1994", 1994.

Underwriters Laboratories Inc., "Gas nad Oil Equipment 1995", 1995.

CertainTeed Corporation, "Product Sheet—ToughGard Duct Board Fiber Glass Duct Board Systems", 1994, Valley Forge, Pennsylvania, USA.

Johns–Manville Manufacturing, "Product Specification—Micro–Aire Duct Board Standard Duty Heavy Duty Spec No. 4365–20", 1971–1973, USA.

Johns–Manville Manufacturing, "Product Specification—Micro–Aire Duct Board Standard Duty Heavy Duty Spec No. 4365–15", 1971–1973, USA.

Johns–Manville, Air Handling Systems—SuperDuct™ Coated High Performance Air Duct Board, Type 475 & 800, AHS 200 Jun. 2000.

Johns–Manville, "Air Handling Systems—Linacoustic RC™ Fiber Glass Duct Liner with Reinforced Coating System," (preliminary product information), AHS–329 Feb. 2002.

CertainTeed Corporation, "Specifiction Sheet ToughGard™Duct Liner with Enhanced Surface", 2001.

CETIAT "Test Report" Jul. 24, 1991, 6 pages (including translation attached).

Climaver Plata –Specification of a Product –relevance on first page density 70 kg/m³ (no translation attached) Jun. 1, 1992.

French Republic, National Testing Laboratory, Nov. 28, 1998, 18 pages (including translation attached).

Glasuld "Product Data–Industrial Sheet Black" Sheet: 172 page 1, Nov. 1989, 1 page (14 pages, including translation of parts of the Danish ventilation attached).

Glasuld "Ventilations–Kenaler" Dec. 1989.

Isover Gullfiber –translation of the relevant parts of the Swedish Product Catalogue for Technical Insulation Mar. 1989.

Isover "Price List" Jan. 1991, 51 pages (including translation attached).

Isover Saint–Gobain Roche & Verre–Insulation and Air Conditioning, Mar. 1990, 8 pages (including translation attached).

Roclaine Isover, "Recommended Prices 1993," Cristaleria Espanola S.A., Insulation Division, Jan. 1993, 3 pages (translation attached).

Ultra Additives Catalog, Dee Fo/Agitan defoamers, reprinted Jan. 21, 2003 from http://www.ultraaditives.com.

* cited by examiner

MOISTURE REPELLENT AIR DUCT PRODUCTS

FIELD OF THE INVENTION

The present invention relates in general to building materials products and, in particular, to moisture-resistant fibrous air duct products and methods for making same.

BACKGROUND OF THE INVENTION

Ducts and conduits are used to convey air in building heating, ventilation and air conditioning (HVAC) systems. In many applications, especially in commercial and industrial construction, the ducts are lined with flexible thermal and sound insulating material. The lining enhances the thermal efficiency of the duct work and reduces noise associated with movement of air therethrough. Duct liner may comprise any suitable organic material or inorganic material, e.g., mineral fibers such as fiber glass insulation or the like. Typical fiber glass duct liners, for example, are constructed as fiber glass mats having densities of about 1.5 to 3 pounds per cubic foot (pcf) and thicknesses of about 0.5 to 2 inches. To prevent fiber erosion due to air flow, the insulation may include a coating of on its inner or "air stream" surface. The air stream surface of the insulation is the surface that conveys air through the duct and is opposite the surface that contacts the duct sheet metal in the final duct assembly. The coating also serves to protect the insulation during brush and/or vacuum cleaning of the interior of the duct. Examples of duct liners having coatings on their inner surfaces are provided in U.S. Pat. Nos. 3,861,425 and 4,101,700. Several coated insulation duct liners are marketed under the trade designations ToughGard® by Certain-Teed Corp. of Valley Forge, Pa., Aeroflex® and Aeromat® by Owens Corning Fiberglas Corp. of Toledo, Ohio, Permacote®, and Polycoustic™ by Johns Manville Corp. of Denver, Colo.

Other insulated HVAC systems use ducts either fabricated from or lined with rigid duct boards or tubes. Duct boards are rigid members formed from resin-bonded mineral fibers and whose air stream surfaces may also be provided with protective coatings. Duct boards typically have densities of about 3 to 6 pounds per cubic foot (pcf) and thicknesses of between about 0.5 to 2 inches. Coated and uncoated duct boards are marketed under a variety of trade designations from the aforementioned manufacturers of duct liners. Whether provided on duct liners or duct boards, dedicated water-resistant coatings add to the cost and complexity of manufacturing these products.

It is well known that microorganisms will grow in an environment where moisture and nutrients are present and that many species of microorganisms have a negative impact on indoor air quality (IAQ). If liquid water leaks into air duct insulation, the water may collect and stagnate in the insulation and support the growth of microorganisms.

To address the problem of microorganism growth in HVAC systems, U.S. Pat. Nos. 5,314,719; 5,379,806; 5,487,412 and 5,783,268 disclose providing antimicrobial agents on or in the air-conveying surfaces of impermeable duct liners and/or duct boards. However, these patents offer no insight into effective ways of preventing water that enters duct work from collecting and stagnating in the duct insulation material and causing microbe formation therein. Additionally, antimicrobial agents have very limited zones of effectiveness. That is, they tend to prevent microbe formation only in their immediate vicinity. U.S. Pat. No. 5,314,719, for example, describes a zone of antifungal inhibition of about one millimeter. Typical duct liners and duct boards have insulation thicknesses ranging from about one-half to two inches. In these products, such a limited zone of inhibition would be essentially useless in preventing microorganism formation caused by duct insulation that becomes saturated by water entering through the exterior walls and seams of the duct.

Moisture impermeable coatings, if applied to the airstream surface of air duct insulation products, inhibit ingress of water into the insulation and attendant microorganism formation therein. U.S. Pat. No. 3,861,425 discusses the notion of providing HVAC ducts either composed of or lined with fibrous glass insulation media such as batts, mats, boards or the like with such coatings. While certain coatings may provide the benefits of fiber erosion protection and moisture resistance, they add to the cost and complexity of the products and their methods of manufacture. Coatings applied to the air stream surface of fibrous insulation products may be applied to those products after their formation. This requires application of the coating to the previously formed insulation product by brush, roller, sprayer or by some other means or method and thereafter allowing the coating to cure or dry. This post-formation coating step may prolong the time required to manufacture the insulation product and, whether performed manually or automatically, must be carefully monitored in order to assure uniformity in application of the coating.

Many HVAC systems do not expose their insulation air ducts to significant fiber erosion because they operate at relatively low air velocities. Hence, they do not need insulation products having protective coatings or facing material coverings. Indeed, the aforementioned manufacturers of insulation products offer several uncoated duct liners and duct boards for these sorts of HVAC duct work installations. However, uncoated fibrous insulation HVAC duct products possess limited inherent moisture resistance. Consequently, they are susceptible to microorganism formation in the event they become wet.

An advantage exists, therefore, for uncoated yet water-resistant fibrous air duct insulation products, as well as simple and economical methods for making such products.

SUMMARY OF THE INVENTION

The present invention provides water-resistant fibrous air duct insulation products and methods for making such products. More particularly, the invention provides a duct board or tube comprising a resin-bonded glass fiber mat having a uncoated, water-repellent air stream surface. The duct board or tube is preferably rendered water-repellent by incorporating a hydrophobic agent into the resin used to bind the mat fibers nearest the airstream surface. In this way, liquid water in the interior of the duct will be repelled from entering the insulation, thereby reducing the likelihood of microbial growth in the insulation.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

Figure 1:
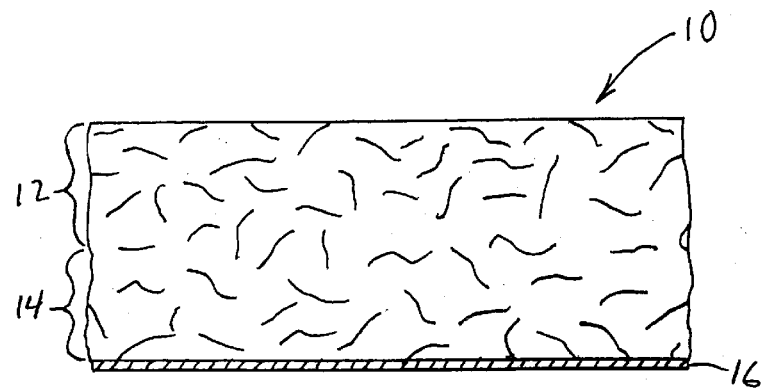
FIG. 1 is side elevation view of an insulated air duct product constructed according to the present invention.

Referring to FIG. 1, there is shown a segment of an insulated air duct product 10 in accordance with the present invention. Product 10 may be a rigid duct board or tube comprising mineral fibers such as glass fibers, refractory fibers or mineral wool fibers bonded by a suitable resin. As will be appreciated by reference to FIG. 2, product 10 is formed as a series of accumulated layers of resin-bonded fibers which, in the end product, appear and exist as a continuous homogeneous mass rather than as a plurality of distinct or discrete strata or lamina. For simplicity of illustration and explanation, product 10 is disclosed herein as comprising first and second layers 12 and 14, although typical rigid duct boards and tubes include three or more bound layers. Binders that may be used to bind the fibers of layer 12 may include, without limitation, the phenolic binders disclosed in U.S. Pat. Nos. 5,300,562 and 5,473,012, the disclosures of which are incorporated herein by reference. Product 10 may have a density of about 3 to 6 pounds per cubic foot (pcf) and a thickness of between about 0.5 to 2 inches. The thickness and density of product 10 will be dictated by the levels of acoustic and/or thermal insulation that are desired or necessary for a particular building installation.

According to the invention, the duct board or tube is preferably rendered water-repellent by incorporating a hydrophobic agent into the binder of at least one of the layers 12, 14. in the illustrated embodiment, the hydrophobic agent is incorporated into layer 12 whose exposed face defines the air stream surface of product 10. In this way, liquid water or other aqueous liquids in the interior of the duct will be repelled from entering product 10, thereby reducing the likelihood of microbial growth in the insulation. Preferably, a foil/scrim/paper laminate or other suitable vapor retarder layer 16 is adhered or otherwise affixed to the face of product opposite the the air stream surface of layer 12 to prevent moisture from entering the insulation from the ambient environment.

Figure 2:
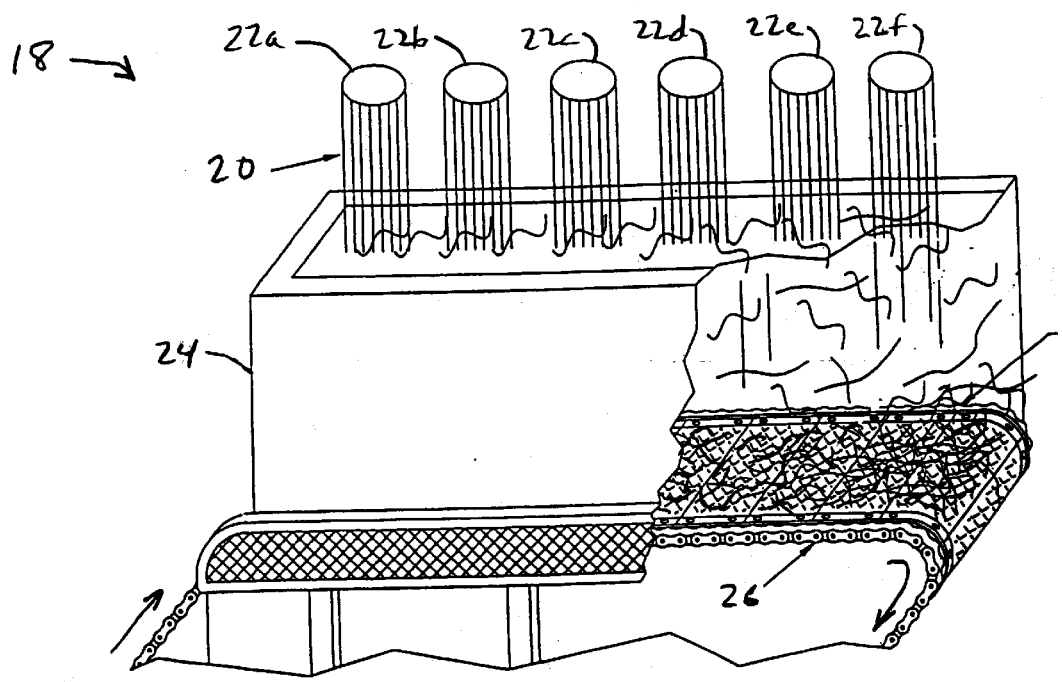
FIG. 2 is a partially broken view of an apparatus for manufacturing a duct board in accordance with the present invention.

Referring to FIG. 2, as is conventional, insulation layers 12 and 14 may be made in forming section 18 by melt spinning molten material, such as glass, into veils 20 of fine fibers using a plurality of fiberizing units 22a–22f. The veils of fibers enter a forming hood 24 where a binder, such as a phenolic resin, in an aqueous carrier (or water and binder in sequence) is sprayed onto the veils 20. In the forming hood 24, fibers are accumulated and collected as a web on a chain, belt or other conventionally-driven conveyor 26. In order to impart hydrophobicity to layer 12, at least fiberizing unit 22f is configured to dispense binder having a hydrophobic agent incorporated therein. After the web exits the forming section 18, it is conveyed to an unillustrated conventional curing oven for compressing and curing the web to a desired thickness and density.

While in the oven, layers 12, 14 are simultaneously heated in order to cure the binder and adhere the layers to one another so as to form the homogeneous mass of product 10. Preferably, layers 12, 14 are held together by unillustrated heated platens or the like under sufficient pressure to compress the layer 12 against layer 14. After product 10 exits the curing oven, vapor retarder layer 16 is applied the product opposite the air stream surface.

The binder used in at least layer 12 preferably includes at least one hydrophobic agent such as silicone, oil, fluorocarbon, waxes or the like in an effective amount sufficient to render the product water repellent and resistant to aqueous solutions containing moderate quantities of solvent. Depending upon the hydrophobic agent selected, effective amounts of hydrophobic agent may range in a ratio of about 1:200 to 1:5 hydrophobic agent to binder. Pursuant to a first embodiment, a commercially available hydrophobic agent suitable for these purposes is DC 347 silicone emulsion manufactured by Dow Corning Corporation of Midland, Mich. Good water repellency characteristics have been shown when this agent is present in a ratio of about 1:24 relative to phenolic resin binder. Alternative hydrophobic agents suitable for use with phenolic resin include Mulrex®, an oil emulsion marketed by the Mobil Oil Corproation of Fairfax, Va. and stock number SL 849 oil marketed by Borden Chemical, Inc. of Columbus, Ohio. Good water repellency characteristics have been shown when Borden® SL 849 oil is present in a ratio of about 1:6 relative to phenolic resin binder.

Moreover, although illustrated herein as it would appear when manufactured as a planar duct board, product 10 may also be formed into a tubular shape by any suitable techniques known in the art whereby the product may alternatively be constructed and function as an insulated duct tube or tubular duct liner.

TABLE 1 depicts the liquid holdout characteristics of product 10 constructed in accordance with the present invention versus those of a control specimen of unmodified Ultra*Duct™ board from CertainTeed Corp. The products were evaluated using using a test similar to the International Nonwoven & Disposables Association (INDA) standard test for alcohol repellency number IST 80.6-92 whose purpose is to measure the resistance of nonwoven fabrics to wetting and penetration by alcohol and alcohol/water solutions. Alcohol repellency serves as a rough estimate of the surface energy or repellency of the test material surface. The water and isopropanol solution holdout times are for 2 ml samples of deionized water or deionized water in a mixture with isopropanol in the indicated quantities.

TABLE 1

| Sample | Identification | Water Holdout Time (hrs) | Isopropanol Solution Holdout Times (hrs/mins) | |
|---|---|---|---|---|
| | | | 10% | 20% |
| Ultra * Duct ™ Duct Board Modified | Control | 24+ | >1 hr | ≦1 min |
| Ultra * Duct ™ Duct Board (with Dow Corning ® DC 437 silicone) Modified | Product 10 | 24+ | >1 hr | >30 min |
| Ultra * Duct ™ Duct Board (with Borden ™ SL 849 m Oil) | Product 10 | 24+ | >1 hr | >30 min |

As TABLE 1 reveals, both the control and products 10 exhibit water holdout times of greater than 24 hours. Although not shown in TABLE 1, for aqueous isopropanol solutions having solvent concentrations of 30% by volume of solvent and higher, the liquid holdout times of all of the products are negligible. However, the liquid holdout times of products 10 are considerably greater than those of the control with respect to the 20% isopropanol solutions.

Although the invention has been described in detail for the purpose of illustration, it is to be understood that such detail is solely for the purpose and that variations can be made therein by those skilled in the art without departing from the spirit and scope of the invention except as it may be limited by the claims.

What is claimed is:

1. An insulated air duct product comprising:
   a first layer formed from fibrous material bound with a resin binder; and
   a second layer formed from fibrous material bound with a resin binder, wherein the resin binder of at least one of said first and second layers is formed from a resin in an aqueous carrier mixed with a hydrophobic agent in emulsion form, the resin binder including an effective amount of the hydrophobic agent to render the product water repellent and resistant to aqueous solutions of about 20% by volume of isopropyl alcohol,
   wherein the first and second layers are formed into a water resistant air duct that conveys air.

2. The product of claim 1 wherein said effective amount of hydrophobic agent is present in said binder in a ratio of about 1:200 to 1:5 hydrophobic agent to binder.

3. The product of claim 1 wherein said hydrophobic agent is selected from the group consisting of silicone, oil, fluorocarbon and waxes.

4. The product of claim 1 wherein said first layer is rigid.

5. The product of claim 1 wherein the product is a duct board.

6. The product of claim 1 wherein the product is a duct tube.

7. A method for making an insulated air duct product, said method comprising the steps of:
   (a) providing a first layer formed from fibrous material bound with a resin binder;
   (b) providing a second layer formed from fibrous material bound with a resin binder, wherein the resin binder of at least one of said first and second layers is formed from a resin in an aqueous carrier mixed with a hydrophobic agent in emulsion form, the resin binder including an effective amount of hydrophobic agent to render the product essentially impermeable to water and resistant to aqueous solutions of about 20% by volume of solvent;
   (c) adhering said first layer to said second layer; and
   (d) forming said first and second layers into a water resistant air duct that conveys air.

8. The method of claim 7 wherein said effective amount of hydrophobic agent is present in said adhesive in a ratio of about 1:200 to 1:5 hydrophobic agent to binder.

9. The method of claim 7 herein said hydrophobic agent is selected from the group consisting of silicone, oil, fluorocarbon and waxes.

10. The method of claim 7 wherein said first layer is rigid.

11. The method of claim 7 wherein the product is a duct board.

12. The method of claim 11 wherein the product is a duct tube.

13. The method of claim 7, further comprising spraying the resin binder mixed with the hydrophobic agent on the one of said first and second layers.

* * * * *